United States Patent [19]

Pulsifer

[11] Patent Number: 4,974,801
[45] Date of Patent: Dec. 4, 1990

[54] APPLIANCE SECURING AND LEVELING MECHANISM

[76] Inventor: Gary Pulsifer, Kevin La., East Greenbush, N.Y. 12061

[21] Appl. No.: 412,781

[22] Filed: Sep. 26, 1989

[51] Int. Cl.⁵ ......................................... F16M 11/14
[52] U.S. Cl. ................................ 248/181; 248/188.4; 296/24.1
[58] Field of Search .................. 248/352, 188.4, 188.2, 248/181, 183; 296/24.1; 280/763.1, 764.1

[56] References Cited

U.S. PATENT DOCUMENTS

| | | | |
|---|---|---|---|
| 3,491,977 | 1/1970 | Iller | 248/188.4 X |
| 3,856,248 | 12/1974 | Labelle | 248/188.2 |
| 3,974,994 | 8/1976 | Petterson | 248/181 X |
| 4,068,961 | 1/1978 | Ebner et al. | 248/181 X |
| 4,354,654 | 10/1982 | Werner et al. | 248/181 X |
| 4,436,335 | 3/1984 | Yoos | 296/24.1 |
| 4,483,503 | 11/1984 | Gahan | 248/181 X |
| 4,542,872 | 9/1985 | Marino et al. | 248/183 |
| 4,564,166 | 1/1986 | Craft et al. | 248/183 X |
| 4,570,892 | 2/1986 | Czech et al. | 248/183 X |
| 4,738,422 | 4/1988 | Matheson et al. | 248/183 |

*Primary Examiner*—David M. Purol
*Attorney, Agent, or Firm*—Schmeiser, Morelle & Watts

[57] ABSTRACT

A leveling device which utilizes joining convex and concave dishes. The concave dish is attachable to a support platform to hold an appliance or other item which requires leveling as is often the case when these items are in recreational vehicles. The dishes are joined together to be slideable with regard to each other permitting the concave dish and platform to be articulated to any position above the convex dish.

8 Claims, 6 Drawing Sheets

APPLIANCE SECURING AND LEVELING MECHANISM

BACKGROUND OF THE INVENTION

The present invention relates to mechanisms for securing and leveling appliance type structures and other similar structures. More particularly it relates to a mechanism adapted for convenient, reliable use in structures such as mobile homes, recreation vehicles and the like, to permit the appliances and similar mechanisms in such structures to be secured and leveled.

It is generally known that vehicles such as recreational vehicles are frequently moved from one location to another as the occupants seek the new environments and new experiences to be found in new locations. Many of the more scenic locations are found in locations which have uneven terrain and essentially all recreational vehicles are at one time or another on such uneven terrain. It is frequently the case in such scenic areas that the vehicle is parked on a slope because the terrain does not present a prefectly flat and level parking space. The vehicles themselves are frequently about 8 feet wide and 40 feet long so that the finding of a perfectly flat parking space is frequently difficult or simply not possible. Many of the parks which cater to such RV's are themselves on uneven terrain and the rented spaces which are provided for use by the RV's are on significant slopes and are therefore not themselves horizontal. For these and other reasons it is frequently the case that such vehicles spend the night on a sloped parking space. And then spend the next night on a space with a different slope. So that frequent leveling adjustment of the vehicle is needed as the vehicle goes from one location to another.

The leveling of an entire recreational vehicle requires substantial energy and the mechanism which can accomplish such leveling must be capable of exerting considerable force. Such leveling can be accomplished with a set of vehicle jacks. For a recreational vehicle the lower level cost of such a set of jacks is about $3000.00 and they can cost as much as $4500.00 or more. There is a need for a lower cost mechanism for accomplishing the leveling which is needed in connection with recreation vehicle use.

A refrigerator is one of the appliances with is most sensitive to non-level support. Where the refrigerator is not in a true upright position the condensed freon coolant can get trapped where it should not be in the condenser tubing, or evaporator tubing, or other part of the cooling mechanism of the refrigor, and block the gravity flow of liquid and interfere with the proper movement of the gas. A first result of this blockage is that the cooling mechanism simply does not cool the refrigerator interior. A second result is that the compressor, which liquifies the gas to a liquid to remove its heat, becomes overloaded and this can cause damage to the refrigerator mechanism. Recreational vehicle users who do not level their vehicles properly can find that their refrigerators are damaged and have to be repaired or replaced. The type of refrigerator which operates in a recreational vehicle can operate from a 12 volt power supply or from a 110 volt conventional household power supply or it can alternatively operate from a supply of propane. Repair or replacement of such mechanisms is expensive.

A number of U. S. patents have been issued dealing with various types of mechanisms for aligning various structures and assemblies. The following such patents are known to the inventor: U.S. Pat. Nos. 4,549,710; 4,483,503; 4,365,779; 4,500,060; 2,922,609; 4,354,654; 2,893,674; 4,554,590; 4,068,961 and 4,564,166. However none of these patents discloses or describes a mechanism which is suitable or satisfactory for solving the problem which confronts the occupants of a recreational vehicle, or even provides information which makes the solution of the problem readily evident or obvious.

BRIEF STATEMENT OF THE INVENTION

It is accordingly one object of the present invention to provide a mechanism for leveling and securing appliances in recreational and similar vehicles.

Another object is to substantially reduce the cost of bringing portable appliances into upright position for operation.

Another object is to assist the occupants and users of recreational vehicles in maintaining the operation of the vehicle appliances free from hazard and damage.

Another object is to simplify the overall operation of recreational and similar vehicles.

Still another object is to provide a leveling mechanism for portable appliances and similar mechanisms.

Other objects and advantages of the invention will be in part apparent and in part pointed out in the description which follows.

In one of its broader aspects objects of the invention can be achieved by providing an appliance leveling mechanism which is particularly adapted to use in connection with mobile homes, recreational vehicles and similar vehicles. The mechanism includes a base member adapted to be secured to a horizontal surface within the vehicle and this base member attains the same pitch as the floor of the vehicle. The base member preferably has the form of a less than hemispherical convex dish with an enlarged top opening. There is mounted over the convex dish in nesting relation a less than hemispherical concave dish having an outer diameter substantially less than that of the convex dish. The radius of curvature of the mating surfaces of both dishes is the same. A lubricious surface is provided between the two confronting surfaces of the dishes so that the sliding movement of the concave dish on the convex dish results in an articulated motion whereby the concave dish can attain any desired position on the convex dish. An appliance supporting platform is mounted on the back of the concave dish and is adapted for movement with the concave dish. A threaded bolt is attached to and depends centrally from the center of the concave dish and platform and extends downward through the central opening of the convex dish. A lock washer is supported on the depending bolt by a lock nut threaded onto the lower end of the bolt. The diameter of the lock washer is larger than that of the enlarged top opening in the convex plate so that if the lock nut is tightened onto the bolt it forces the washer against the underside of the convex dish and locks the two dishes together temporarily against further articulated movement. When the lock nut is loosened again the lockwasher is released and the two plates may again be articulated. The lock nut is adapted to be turned by hand. To provide access to the locknut at least one pair of aligned hand access openings are provided in the concave and convex dishes respectively.

BRIEF DESCRIPTION OF THE DRAWINGS

The description of the invention which follows will be understood with greater clarity if reference is made to the accompanying drawings in which.

DETAILED DESCRIPTION OF THE INVENTION

The problems of the non-working appliance which are described above in the background statement of this application can be overcome in accordance with this invention by realigning the individual appliances themselves rather than trying to realign the vehicle either through adjustment of the parking location or through the use of the high strength and high price jacks. The present invention provides a leveling mechanism which is particularly adapted and useful in connection with vehicles such as the recreational type vehicles.

Figure 1:
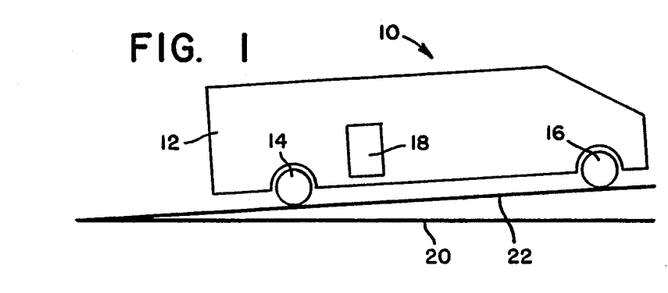
FIG. 1 is a schematic side elevation of a recreational vehicle parked on an incline with the front end elevated.
Figure 2:
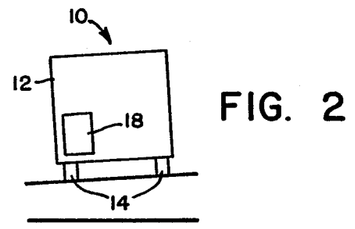
FIG. 2 is a schematic rear elevation of the vehicle of FIG. 1 parked on a similar incline but facing so that one side is elevated relative to the other.

To explain the invention reference is first made of FIG. 1. In this figure a schematic illustration of a recreational vehicle 10 is provided. The vehicle 10 has an enclosure 12 adapted for human habitation and pairs of wheels 14 and 16 to facilitate locomotion. Within the vehicle a typical appliance 18 is illustrated as positioned along one side of the long body of the vehicle. In FIG. 2 a rear view of the vehicle 10 is provided. In this rear view the rear portion of enclosure 12 is illustrated as being supported by the rear wheels 14. The appliance 18 is positioned as it is in most such vehicles at one side of the vehicle. It is particularly noteworthy in these illustrations that both the vehicle shown in side view and that shown in end view are not shown to be parked on level ground as represented by line 20. Rather they are parked on an incline, represented by line 22, as is very common to uneven terrain. An incline 22 of the character illustrated is sufficient to cause an appliance 18, such as a refrigerator, to operate improperly or to cause it to be damaged in its operation. As is indicated above it is for this reason that users of such recreational vehicles and of similar vehicles employ expensive jacks to level their vehicles and to bring the appliances therein into full and true upright positions.

The manner in which the present invention may be practiced may be illustrated with reference next to FIGS. 3 and 4.

Figure 3:
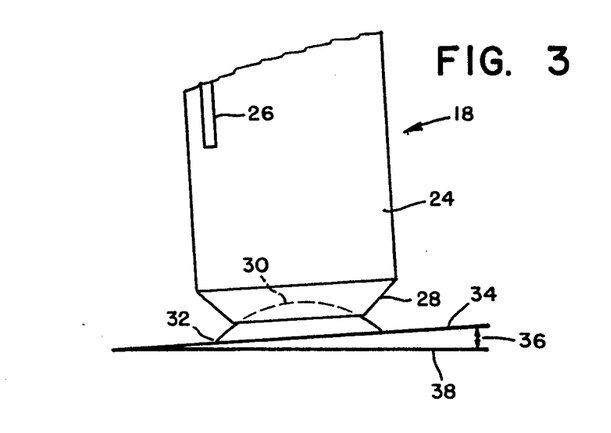
FIG. 3 is a partial front elevation of a refrigerator within the vehicle of FIG. 1 and showing that it is inclined from true vertical just as the vehicle is.

Referring first to FIG. 3 the appliance 18 is seen to have a cabinet 24 and a handle 26 for opening the cabinet. The cabinet rests on a platform 28 and may be securely fastened thereto as explained more fully below. The platform is mounted onto a concave dish 30 shown partly in phantom in FIG. 3. Concave dish 30 is mounted in turn onto the convex base 32. Base 32 is secured to a suitable horizontal support surface 34 within the enclosure 12 of the recreational vehicle 10. The surface 34 may be, for example, the floor of the recreation vehicle 10. However as the vehicle is not horizontal but rather is on an incline 22 of FIG. 1, the floor of the vehicle is also not horizontal but is inclined from the horizontal by an angle 36 from the true horizontal 38.

Figure 4:
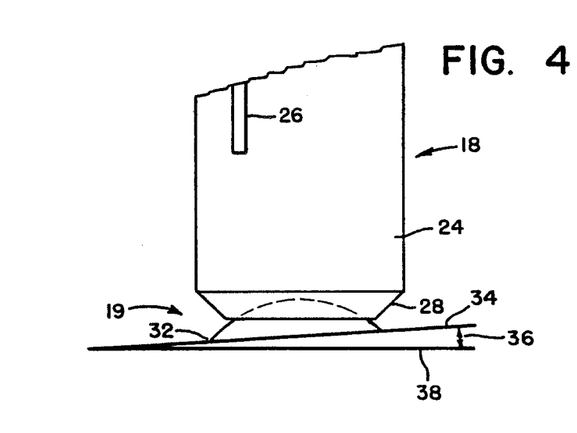
FIG. 4 is a similar partial elevation of the refrigerator of FIG. 3 after the refrigerator has been aligned to a true upright position in accordance with this invention.

With reference next to FIG. 4 the appliance 18 may be seen to be positioned in a true upright position even though the base 19 on which the appliance is mounted is inclined from the vertical. Thus although the appliance 18 is still mounted on a floor surface 34 which is still inclined from true horizontal 38 by the same angle 36 as the floor illustrated in FIG. 3 never the less the appliance is supported by the uneven floor in a true upright position. All of the other parts of the appliance remain the same even though the appliance is by the illustration of FIG. 4 in a full upright position.

Figure 5:
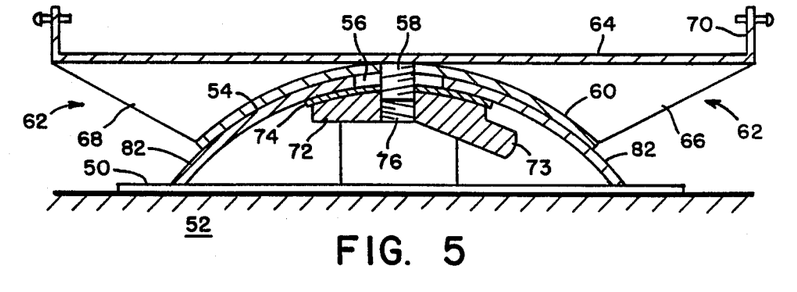
FIG. 5 is a vertical sectional view of a leveling mechanism as provided pursuant to this invention.

The manner in which the levelling of the appliance is accomplished is described next with reference to FIGS. 5 and 6. Referring first now to FIG. 5 a vertical view, in part in section, of a levelling mechanism is illustrated. In this figure an anchor plate 50 of the mechanism is disposed on a support surface 52. A convex dome shaped dish 54 of a selected radius of curvature is attached, as by welding, to anchor plate 50. Alternatively the anchor plate 50 and the convex dish 54 may be formed of a single sheet of metal by conventional metal forming techniques. The dish 54 has an oversize top opening 56. By oversize here is meant that the opening is larger than that needed to admit a bolt 58 so that the bolt may be located at various positions within the opening 56 as will be readily evident from the figure. A concave dish 60 having a radius of curvature matching that of dish 54 is nested over to be supported by the convex dish 54. The concave dish 60 forms a part of an upper support mechanism for an appliance. The mechanism 62 includes the concave dish 60 and a platform 64 supported on the dish 60 in part by contact with the middle of dish 60 and in part by a number of braces such as 66 and 68 which are attached to the underside of the platform 64 and the upperside of the concave plate 60. A lip 70 may be formed or attached at the outer edge of platform 64 to facilitate the location and support of an appliance on the platform. Screw fasteners 71 are threaded through lip 70 and may be used to secure an appliance onto platform 64.

Bolt 58 is attached as by welding to the underside of the platform 64 and concave dish 60. The bolt 58 depends from the center of the concave dish 60 through the oversize opening 56 and into the space defined beneath the convex curved dish 54. A locking nut 72 having a handle 73 is threaded onto the lower end 76 of bolt 58 and supports a lock washer 74 in place beneath the inner surface of convex dish 54.

Figure 6:
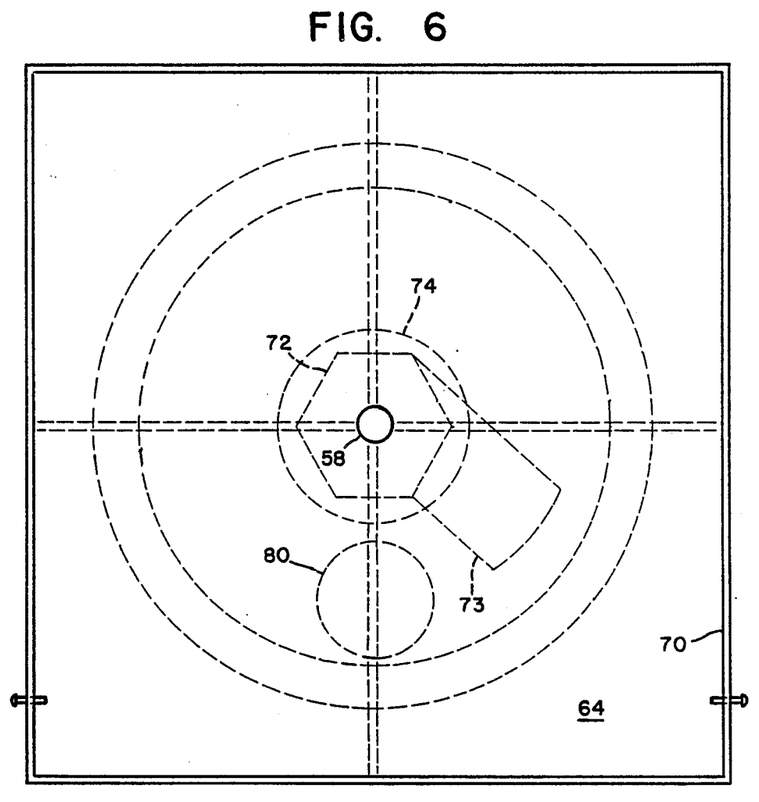
FIG. 6 is a top plan view of the mechanism of FIG. 5 having some of the parts of the mechanism in phantom.

With reference now to FIG. 6 the relationship of some of the parts described above may be seen by the representation of these parts in phantom in FIG. 6. The bolt 58 is at the center of the lock washer 74 and at the center of the lock nut 72 having handle 73. A pair of aligned hand access holes 80 permit the user to access the handle of the lock nut by hand and to turn the handle 73, and thus the locknut 72, to either loosen or to tighten it. By tightening the locknut 72 the lockwasher 74 is urged up against the underside of the convex dish 54. This action presses the two curved dishes 54 and 60 together and prevents any sliding motion of one relative to the other. However when the locknut 72 is loosened relative sliding motion is feasible and the upper dish 60 may be moved in any direction to bring the appliance supported on platform 64 to true upright position. A lubricious surface such as a nylon layer 82 may be positioned on either of the confronting curved surfaces of the dishes 54 and 60 to assist smooth movement of one dish relative to the other. In this way platform 74 is brought to true level and the operation of the supported appliance is assisted. Once the platform is in the true level position and the supported appliance is in the true upright position the handle 73 may be turned to tighten the locknut 72 and the platform is thus anchored in place.

The appliances will remain upright just so long as the vehicle remains on the same inclined surface. Once the vehicle is moved to another location then the process of levelling the platform or platforms in the vehicle must be repeated to ensure proper operation of the appliances. Accordingly there is provided by the mechanism of this invention a simple and inexpensive means for ensuring proper operation of the appliances of a recreational or similar vehicle. The cost of the mechanism is substantially less than one tenth of the cost of the vehicle leveling devices of the prior art.

Some modification of the mechanisms of the present invention may be made without departing from the spirit and scope of the present invention. Some such modifications are now described.

One such modification involves larger appliances such as larger refrigerators and particularly those which are built into a vehicle. Such a built in refrigerator may be positioned flush with other appliances or cabinets. For an appliance to function in the manner described above, the appliance must be free to move in any direction around a 360 degree circle. For example, with reference to FIG. 1 it is evident that to overcome the front to back tilt of the appliance the appliance must be free to move in a direction parallel to the length of the vehicle. Conversely for an appliance in a vehicle as depicted in FIG. 2 the appliance must be free to move laterally of the vehicle to achieve a true upright orientation. But if the vehicle is parked on a slope which tilts the vehicle both longitudinally and laterally the appliance must be free to move in directions which include both longitudinal and lateral motion. It is apparent from the description given above that the apparatus as described with reference to the FIGS. 3 to 6 that such motion in any needed direction including longitudinal and lateral and any combination of these motions can be accomplished with ease.

Now with reference to an appliance which is a "built in" of a recreation vehicle it is evident that to permit the present invention to be carried out there must be a separation between an appliance which is individually subject to levelling in accordance with the present invention and adjoining appliances, cabinets, furniture or the like. In this connection one modification of the present invention provides a flush mount for appliances to be leveled. The flush mount modification can be described with reference to FIGS. 7 and 8.

Figure 7:
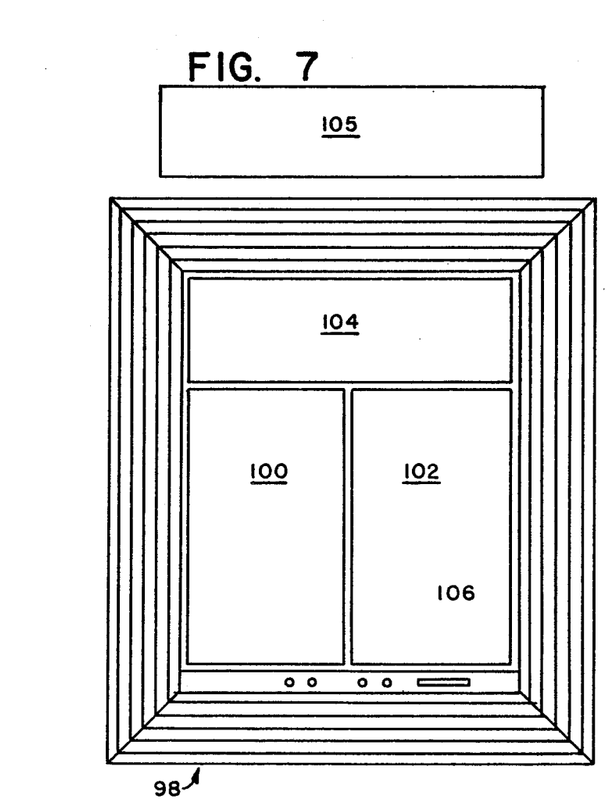
FIG. 7 is a front elevation illustrating a flush housing of a refrigerator in a vehicle.
Figure 8:
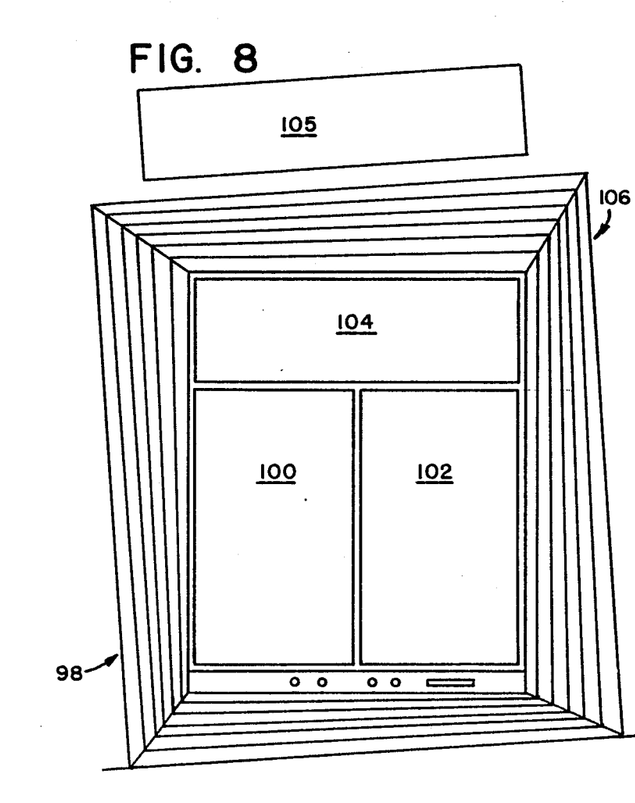
FIG. 8 is a front elevation of the refrigerator of FIG. 7 after the alignment of the refrigerator has been changed to allow for the uneven terrain on which the vehicle is parked.

Referring now first to FIG. 7 a flush mounted refrigerator is illustrated. From the figure the refrigerator 98 may be discerned to be a larger variety having a plurality of doors and in particular three doors 100, 102, and 104. The flush mounting is accomplished with the aid of an accordion apron 106 which extends fully around the entire front surface of the refrigerator 98. The accordian apron 106 is one which is adapted to enlarging or extending in any direction as the refrigerator is moved in that direction. The apron 106 can also shrink or collapse at one side in compensation for an expansion of the apron at the other side. The refrigerator can be moved from side to side or can be moved backward or forward to achieve a true upright position and the apron accomodates that movement and still maintains a flush mounting of the refrigerator relative to the other cabinets of appliances of the vehicle in which refrigerator is mounted. The refrigerator 98 of FIG. 8 is housed in a vehicle which is parked on an incline similar to the incline 34 of FIG. 4. However the refrigerator is able to achieve a true upright position in the vehicle and still retain its flush mount because of the combination of the accordian apron 106 with the leveling mechanism which is now described.

Figure 9:
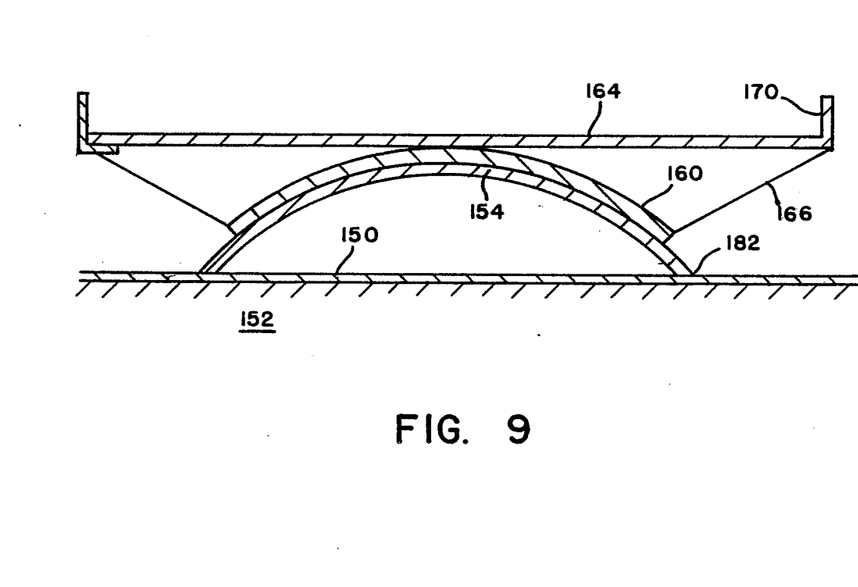
FIG. 9 is a vertical sectional view of a base aligning mechanism for a flush mounted refrigerator.

Referring now next to FIG. 9 a vertical sectional view of a positioning mechanism for use in connection with an overhead securing mechanisms is illustrated. In FIG. 9 parts are illustrated which resemble some of the parts illustrated in FIG. 5. For clarity of reference the reference numerals used in FIG. 5 are employed in FIG. 9 but they are increased by a value of 100. Thus a base plate 150 is illustrated as disposed on a support surface 152. A less than hemispherical dish 154 is attached to or formed with the base plate 150 to provide a convex support on which an upper concave plate 160 can rest. Braces 166 extend upward from concave plate 160 to support a platform 164 on which an appliance such as the refrigerator of FIGS. 7 and 8 can be mounted. A lip 170 may be formed along the perimeter of the platform 164 to facilitate retaining an appliance in a desired position on the platform. A nylon liner 182 may be disposed on or attached to the convex plate 154 or the concave plate 160 to facilitate pivoting motion of the platform and the supported appliance above the base plate 150. The mechanism thus described permits articulated movement of an appliance mounted on the platform to achieve any angle needed to attain true upright position.

To position a larger refrigerator as illustrated with reference to FIGS. 7 and 8 a mechanism is provided at the top of the refrigerator and this mechanism is particularly adapted to cooperate with the articulated pivot mechanism to provide both articulation of the pivot joint described below and also an unlocking of the mechanism prior to the positioning of the refrigerator and a locking of the refrigerator into place once the movement to a true upright position has taken place. In this sense the appliance itself becomes part of the mechanism to permit the proper positioning to take place.

Figure 10:
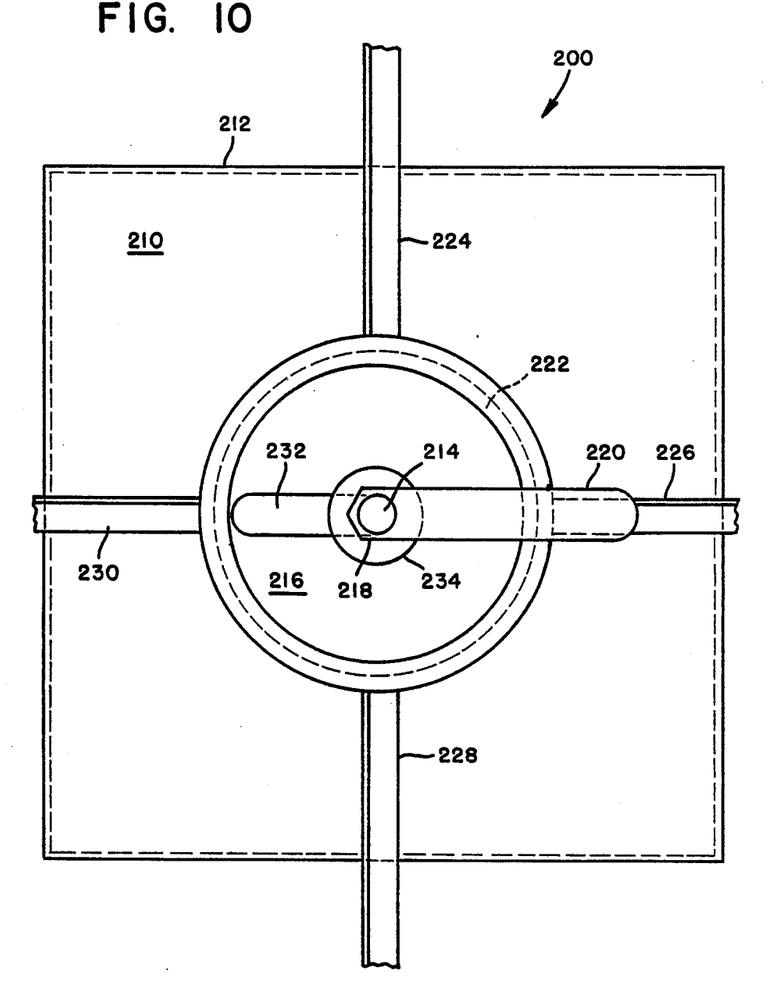
FIG. 10 is a top plan view of the top aligning mechanism for a flush mounted refrigerator.

Referring now next to FIG. 10 there is illustrated a top positioning and locking mechanism. This mechanism includes a top plate 210 having a downwardly extending lip 212. The plate and lip are of a size which nests securely over the top of the appliance to be secured and positioned and are initially held in place by gravity. The plate 210 holds the appliance and moves with the appliance as the appliance is positioned with the mechanism. There is a locking bolt 214 attached to and extending up from the plate 210. The bolt 214 is best seen in FIG. 11 in its relation to the plate 210.

Figure 11:
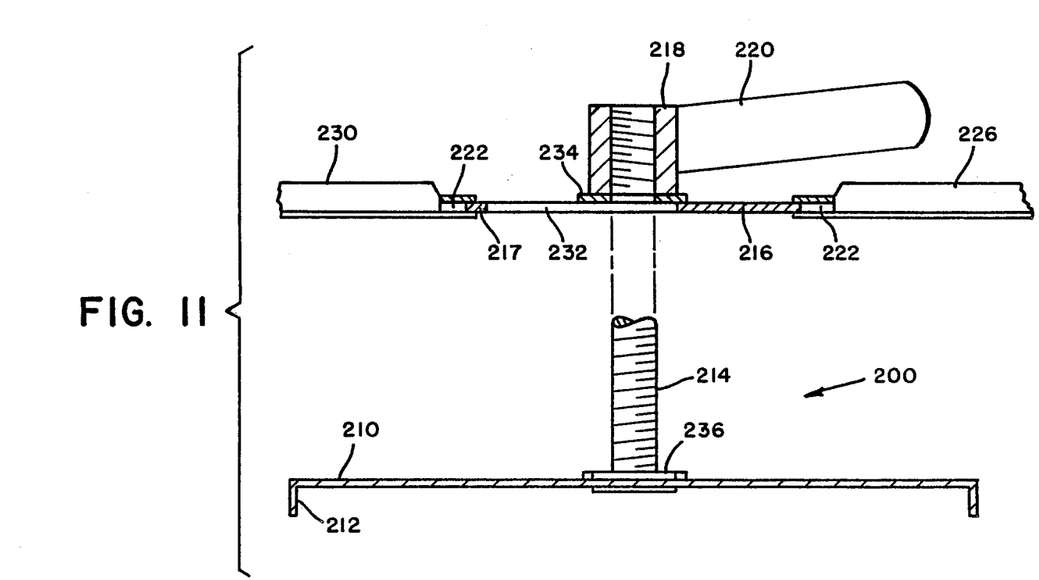
FIG. 11 is an exploded vertical sectional view of the mechanism of FIG. 10.

FIG. 11 is an exploded view of the positioning mechanism. The mechanism includes the plate 210 and bolt 214 as one unit. It also includes an upper slotted disk 216 and a lock nut 218 with a handle 220 attached to the lock nut as a second unit. The edges of the disk 216 are supported in a fixed peripheral runway 222. The runway 222 is in turn supported by angle braces 224, 226, 228 and 230 which are fixedly mounted to the walls of a housing, not shown, within the vehicle 10. The runway 222 is of generally C shaped cross section and the edges 217 of the disk 216 fits snugly within the C form of the runway but can nevertheless be easily rotated therein.

The disk 216 is preferably made of nylon and is provided with an elongated slot opening 232 to permit the threaded bolt to slide therein as the bolt 214 and plate 210 are moved to position the appliance in a true upright position. Thus while the bolt 214 is permanently and fixedly attached to the plate 210 the bolt can both move along the slot 232 and the disk 216 can rotate to bring the bolt 218 to any position within a circle defined by the runway 222. By rotating the disk 216 and sliding the bolt 218 in the slot 232 the bolt can be brought to a position which leaves the appliance in a true upright position. It is only after the appliance is in the true upright position that the bolt is fixed in a single position. The bolt 214 is fixed in position when the nut 218 firmly grips the nylon disk 216. This tightening occurs when the nut 218 is tightened by handle 220 to clamp the edges of the disk 216 along slot 232 between two ribbed washers 234 and 236.

For an appliance having the advantages of the flush mounting depicted in and described with reference to FIGS. 7 and 8 the access to the upper portion of the alternative leveling mechanism described immediately above is through a hinged door 105 as illustrated in FIGS. 7 and 8. The access through this door permits the handle 220 to be gripped and turned to first loosen the nut 218. After the nut 218 is loosened the bolt 214 can be moved to any position needed to set the appliance to a true upright position and the nut can then be tightened to hold the appliance in that position.

To ascertain the true upright position a leveling indicator is incorporated into the mechanism. The leveling indicator may be for example a full round bubble level indicator which indicates the level of a plane. The bubble level indicator is preferred. Alternatively two bent tube level indicators positioned at right angles may be employed to determine true level or true upright positions for the appliance.

What is claimed and sought to be protected by Letters Patent of the United States is as follows:

1. A recreational vehicle adapted for convenienced human habitation, said vehicle including an enclosure adapted for human occupancy, said enclosure being mounted for movement on wheels and having openings for human ingress and egress, sanitary facilities and a set of appliances within said enclosure for heating, cooling, and cleaning, at least one of said appliances having a need to be upright for efficient operation, means for leveling said at least one appliance, said means comprising:

a less than hemispherical convex base dish of a preselected radius of curvature and of a diameter slightly smaller than that of the appliance to be supported thereabove, said dish being mounted to a horizontal support in said enclosure parallel to the floor of said enclosure, an upper portion of said convex dish having an enlarged top opening;

a concave dish of the same radius of curvature but of smaller diameter than said convex dish to permit the concave dish to slide in articulated motion on said convex dish;

said concave dish having mounted thereon an appliance supporting platform adapted to support an appliance thereon and adapted for movement with said concave dish;

a threaded bolt depending centrally from said concave dish and platform and extending through the enlarged top opening of said convex dish;

a lock washer supported by a lock nut onto the lower end of said depending bolt, the diameter of said washer being larger than that of the enlarged top opening of said convex dish whereby the threading of said locknut onto said bolt brings the upper surface of said lock washer against the undersurface of said convex dish to force the two dishes together and to hold the concave dish and platform in a fixed position relative to the convex dish, and whereby the loosening of said locknut permits sliding motion between said dishes and permits the concave dish and platform to be articulated to any position above said convex dish; and at least one set of aligned hand access openings through the complementary curve surfaces of both said concave and convex dishes whereby hand access is provided to the locknut threaded onto said depending bolt.

2. The recreational vehicle of claim 1 in which the appliance is a refrigerator.

3. The recreational vehicle of claim 1 in which the lock nut is provided with a handle which permits the loosening and tightening of the lock nut with hand force.

4. A leveling mechanism for leveling an appliance in a vehicle parked on non-level terrain which comprises;

a less than hemispherical convex base dish having a preselected radius of curvature and having a diameter slightly smaller than the smallest horizontal dimension of the appliance to be supported;

an upper portion of said convex dish having an enlarged top opening and a bottom portion of said convex dish being mounted to a primary support surface;

a less than hemispherical concave dish mounted over said convex dish in nester relation, said concave dish having the same preselected radius of curvature but having a diameter substantially smaller than that of the convex dish to permit the concave dish to slide in articulated motion on said convex dish;

said concave dish having mounted thereon an appliance supporting platform adapted for movement with said concave dish;

a threaded bolt depending centrally from said concave dish and platform and extending through the enlarged top opening of said convex dish wherein said opening has a diameter that is substantially larger than the bolt diameter whereby the bolt may be moved radially within said opening, a lock washer having a similar radius of curvature as that of said convex dish, said lock washer being supported by a locknut threaded onto the lower end of said depending bolt, wherein said locknut has a surface which contacts a major portion of the underside of said washer and said washer contacting surface has a similar radius of curvature to that of said washer and wherein the diameter of said washer being larger that of the enlarged top opening of said convex dish whereby the threading of said locknut onto said bolt brings the upper surface of said lock washer against the undersurface of said convex dish to force the two dishes together and to hold the concave dish and platform in a fixed position relative to the convex dish, and whereby the loosening of said locknut permits sliding motion between said dishes and permits the concave dish and platform to be articulated to any position above said convex dish.

5. The leveling mechanism of claim 4 in which there is at least one set of aligned hand access openings through the complementary curved surfaces of both dishes.

6. The leveling mechanism of claim 4 in which there is a handle on the locknut to permit loosening and tightening of said locknut by hand force.

7. A leveling system for leveling an appliance in a vehicle parked on non-level terrain which comprises:
 a less than hemispherical convex base dish having a preselected radius of curvature and having a diameter slightly smaller than the smallest horizontal dimension of the appliance to be supported, said base dish having a top opening and a bottom portion of said convex dish being mounted to a primary support surface;
 a less than hemispherical concave dish mounted over said convex dish in nester relation, said concave dish having the same preselected radius of curvature but having a diameter substantially smaller than that of the convex dish to permit the concave dish to slide in articulated motion on said convex dish;
 said concave dish having mounted thereon an appliance supporting platform adapted for movement with said concave dish;
 a box-shaped appliance having substantially flat top and bottom surfaces, said bottom surface being connected to said appliance supporting platform; and
 a positioning and locking means mounted to the top surface of said appliance and to a support member rigidly connected to said vehicle, said positioning means comprising: a plate which is fastened to the appliance; an upwardly extending member attached to said plate; a disc-shaped member having a radially extending slot through which said upwardly extending member passes; an adjustable fastening means connected to said upwardly extending member, said fastening means providing a means to adjustably fix said upwardly extending member to said disc-shaped member in a plurality of spaced locations; and a top support member which is secured to the support member that is rigidly connected to said vehicle, said top support member including means for rotatably securing said disc-shaped member.

8. The system of claim 7 further comprising an accordion apron which surrounds a perimeter surface of said appliance and which is connected to said appliance and to a vehicle attached structure surrounding said appliance.

* * * * *